United States Patent
Maguire

(10) Patent No.: US 11,795,297 B2
(45) Date of Patent: *Oct. 24, 2023

(54) PLASTICS COLORING USING COTTONSEED OIL-BASED LIQUID COLOR COMPOSITIONS

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/856,431

(22) Filed: Apr. 23, 2020

(65) Prior Publication Data

US 2020/0247975 A1    Aug. 6, 2020

Related U.S. Application Data

(63) Continuation-in-part of application No. 16/822,415, filed on Mar. 18, 2020, now Pat. No. 11,602,883, and a continuation of application No. 15/883,501, filed on Jan. 30, 2018, now Pat. No. 10,767,031, and a continuation of application No. 15/432,495, filed on Feb. 14, 2017, now Pat. No. 10,919,206, which is a continuation-in-part of application No. 14/333,579, filed on Jul. 17, 2014, now Pat. No. 9,708,462.

(60) Provisional application No. 61/847,119, filed on Jul. 17, 2013.

(51) Int. Cl.
| | |
|---|---|
| *C08K 5/09* | (2006.01) |
| *C08K 5/00* | (2006.01) |
| *B29C 48/06* | (2019.01) |
| *B29C 48/29* | (2019.01) |
| *B29C 48/94* | (2019.01) |
| *B29C 45/00* | (2006.01) |
| *C08J 3/22* | (2006.01) |
| *C08K 3/013* | (2018.01) |
| *C08J 3/205* | (2006.01) |
| *B29K 105/00* | (2006.01) |
| *B29K 101/12* | (2006.01) |

(52) U.S. Cl.
CPC ............ *C08K 5/09* (2013.01); *B29C 45/0001* (2013.01); *B29C 45/0013* (2013.01); *B29C 48/06* (2019.02); *B29C 48/29* (2019.02); *B29C 48/94* (2019.02); *C08J 3/2053* (2013.01); *C08J 3/226* (2013.01); *C08K 3/013* (2018.01); *C08K 5/0041* (2013.01); *B29C 2948/92704* (2019.02); *B29K 2101/12* (2013.01); *B29K 2105/0011* (2013.01); *B29K 2105/0032* (2013.01); *B29K 2105/0044* (2013.01); *C08J 2300/00* (2013.01); *C08J 2300/22* (2013.01); *C08J 2491/00* (2013.01)

(58) Field of Classification Search
CPC ............. B29C 70/58; B29C 2045/004; B29C 2045/0039; B29C 44/3442; B29C 44/183; B29C 31/06; B29C 48/375; B29C 48/36; B29C 48/0013; B29C 48/0012; B29C 48/0011; B29C 48/001; B29C 2035/043
See application file for complete search history.

(56) References Cited

U.S. PATENT DOCUMENTS

| | | |
|---|---|---|
| 600,233 A | 3/1898 | Palm |
| 1,305,964 A | 6/1919 | Dickson |
| 1,451,759 A | 4/1923 | Bruhn |
| 1,482,376 A | 2/1924 | Anderson |
| 1,489,348 A | 4/1924 | Hampton |
| 1,707,977 A | 4/1929 | Davis |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |
| 2,873,892 A | 2/1959 | Nelson et al. |
| 2,909,315 A | 10/1959 | Sampietro |
| 2,956,822 A | 10/1960 | Kates |
| 3,252,618 A | 5/1966 | Anderson |
| 3,297,049 A | 1/1967 | Moscovitz |
| 3,391,645 A | 7/1968 | Koza |
| 3,468,904 A | 9/1969 | Kritchevsky |
| 3,471,178 A | 10/1969 | Roe |
| 3,477,698 A | 11/1969 | Smith et al. |
| 3,481,509 A | 12/1969 | Marhauer |

(Continued)

FOREIGN PATENT DOCUMENTS

| | | |
|---|---|---|
| CA | 2643213 A1 | 8/2007 |
| CN | 2809263 Y | 8/2006 |

(Continued)

OTHER PUBLICATIONS

Forty-four page two-sided brochure including cover and back pages entitled "Maguire: Auxiliary equipment for the plastics industry" of Maguire Products Inc. Oct. 2000.

(Continued)

*Primary Examiner* — Stella K Yi
(74) *Attorney, Agent, or Firm* — Fox Rothschild LLP

(57) ABSTRACT

A method of fabricating plastic products having a preselected color, comprising preparing a dispersion of pigment of the preselected color in cottonseed oil; supplying a preselected plastic resin for the product to be fabricated to a process machine having a rotating screw; furnishing the dispersion to the process machine at a position adjacent to threaded portion of the rotating screw; and blending the dispersion and the resin by rotating the screw.

16 Claims, No Drawings

(56) References Cited

U.S. PATENT DOCUMENTS

| | | | |
|---|---|---|---|
| 3,488,204 A | 1/1970 | Hardy |
| 3,518,033 A | 6/1970 | Anderson |
| 3,785,412 A | 1/1974 | Stone |
| 3,814,388 A | 6/1974 | Jakob |
| 3,820,828 A | 6/1974 | Fiddler |
| 3,883,275 A | 5/1975 | Browne |
| 3,953,218 A | 4/1976 | Pollard |
| 3,957,399 A | 5/1976 | Siczek |
| 3,960,393 A | 6/1976 | Hosokawa |
| 3,988,088 A | 10/1976 | King et al. |
| 3,998,103 A | 12/1976 | Bjorklund et al. |
| 4,046,495 A | 9/1977 | Grimm, Jr. |
| 4,124,042 A | 11/1978 | Foulkes |
| 4,185,948 A | 1/1980 | Maguire |
| 4,211,345 A | 7/1980 | Taubenmann |
| 4,251,796 A | 2/1981 | Soeda |
| 4,377,291 A | 3/1983 | Albertini |
| 4,382,618 A | 5/1983 | Grisebach |
| 4,469,127 A | 9/1984 | Kitamura |
| 4,473,173 A | 9/1984 | DeGroff et al. |
| 4,479,107 A | 10/1984 | Bleeke |
| 4,501,405 A | 2/1985 | Usry |
| 4,571,416 A | 1/1986 | Jarzombeck et al. |
| 4,580,721 A | 4/1986 | Coffee |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,759,189 A | 7/1988 | Stropkay |
| 4,796,782 A | 1/1989 | Wales |
| 4,815,042 A | 3/1989 | Pratt |
| 4,834,071 A | 5/1989 | Hosoi et al. |
| 4,921,132 A | 5/1990 | Wales |
| 4,967,940 A | 11/1990 | Blette et al. |
| 5,039,279 A | 8/1991 | Gangemi |
| 5,116,547 A | 5/1992 | Tsukahara et al. |
| 5,183,075 A | 2/1993 | Stein |
| 5,187,993 A | 2/1993 | Nicholson et al. |
| 5,199,852 A | 4/1993 | Danby |
| 5,215,215 A | 6/1993 | Sauer |
| 5,225,210 A | 7/1993 | Shimoda |
| 5,257,914 A | 11/1993 | Reynolds |
| 5,318,431 A | 6/1994 | Chang |
| 5,344,232 A | 9/1994 | Nelson et al. |
| 5,364,242 A | 11/1994 | Olsen |
| 5,402,670 A | 4/1995 | Wicnienski |
| 5,404,904 A | 4/1995 | Glaser |
| 5,423,455 A | 6/1995 | Ricciardi |
| 5,580,503 A | 12/1996 | Hall, III |
| 5,609,191 A | 3/1997 | Topping |
| 5,622,392 A | 4/1997 | Gochenouer |
| 5,723,517 A | 3/1998 | Campo |
| 5,853,244 A | 12/1998 | Hoff et al. |
| 5,911,339 A | 6/1999 | Peterson |
| 5,953,923 A | 9/1999 | Davies |
| 5,980,490 A | 11/1999 | Tsoukalis |
| 5,984,777 A | 11/1999 | Kuchar |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,287,491 B1 | 9/2001 | Kilim et al. |
| 6,386,841 B1 | 5/2002 | Probst |
| 6,402,363 B1 | 6/2002 | Maguire |
| 6,402,865 B1 | 6/2002 | Handa et al. |
| 6,502,013 B1 | 12/2002 | Sosnik |
| 6,523,451 B1 | 2/2003 | Liao |
| 6,599,005 B2 | 7/2003 | van Der Wei |
| 6,669,358 B2 | 12/2003 | Shimoda |
| 6,719,453 B2 | 4/2004 | Cosman et al. |
| 6,732,629 B1 | 5/2004 | Miller et al. |
| 6,840,744 B2 | 1/2005 | Watling |
| 6,853,100 B2 | 2/2005 | Yumita |
| 6,879,876 B2 | 4/2005 | O'Dougherty et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,201,290 B2 | 4/2007 | Mehus |
| 7,264,161 B2 | 9/2007 | Polarine |
| 7,311,882 B2 | 12/2007 | Renzi |
| 7,390,119 B2 | 6/2008 | Maguire |
| 7,416,096 B2 | 8/2008 | Maguire |
| 7,526,911 B2 | 5/2009 | Pickard et al. |
| 7,594,717 B2 | 9/2009 | Sheinman |
| 7,958,915 B2 | 6/2011 | Maguire |
| 7,980,834 B2 | 7/2011 | Maguire |
| 8,042,578 B2 | 10/2011 | Post |
| 8,230,877 B2 | 7/2012 | Roberge et al. |
| 8,574,478 B2 | 11/2013 | Tattum et al. |
| 8,627,852 B2 | 1/2014 | Hatton |
| 8,757,217 B2 | 6/2014 | Maguire |
| 8,800,821 B2 | 8/2014 | Maguire et al. |
| 8,844,584 B1 | 9/2014 | Haley |
| 9,188,118 B2 | 11/2015 | Maguire |
| 9,599,265 B2 | 3/2017 | Maguire |
| 9,637,283 B2 | 5/2017 | Maguire |
| 2002/0023449 A1 | 2/2002 | Park et al. |
| 2002/0031822 A1 | 3/2002 | Van Der Wei et al. |
| 2002/0122103 A1 | 9/2002 | Yamamoto et al. |
| 2002/0189667 A1 | 12/2002 | O'Dougherty et al. |
| 2003/0051767 A1 | 3/2003 | Coccaro |
| 2003/0071868 A1 | 4/2003 | Koshikawa et al. |
| 2003/0095468 A1 | 5/2003 | Shimoda |
| 2003/0142580 A1 | 7/2003 | Maguire |
| 2003/0218014 A1 | 11/2003 | Gregory et al. |
| 2004/0020723 A1 | 2/2004 | Schuman |
| 2005/0052945 A1 | 3/2005 | Maguire |
| 2005/0126638 A1 | 6/2005 | Gilbert |
| 2006/0067844 A1 | 3/2006 | Iversen |
| 2006/0151051 A1 | 7/2006 | Py |
| 2006/0169718 A1 | 8/2006 | Buining |
| 2007/0071624 A1 | 3/2007 | Brewer |
| 2007/0292288 A1 | 12/2007 | Maguire |
| 2008/0267002 A1 | 10/2008 | Rannasmaa |
| 2010/0276033 A1 | 11/2010 | Asp et al. |
| 2010/0322644 A1 | 12/2010 | Ajima |
| 2011/0200464 A1 | 8/2011 | Maguire et al. |
| 2012/0189762 A1 | 7/2012 | Reineccius |
| 2012/0195771 A1 | 8/2012 | Brender a Brandis |
| 2012/0260992 A1 | 10/2012 | Maguire |
| 2012/0328804 A1* | 12/2012 | Allen .............. C08K 5/101 |
| | | 604/11 |
| 2013/0334258 A1 | 12/2013 | Maguire |
| 2014/0087035 A1 | 3/2014 | Cummings |
| 2014/0147288 A1 | 5/2014 | Maguire |
| 2014/0224830 A1 | 8/2014 | Maguire |
| 2014/0348667 A1 | 11/2014 | McCourt et al. |
| 2015/0020713 A1 | 1/2015 | Maguire |
| 2015/0066794 A1 | 3/2015 | Maguire et al. |
| 2015/0108748 A1 | 4/2015 | Maguire |
| 2015/0165662 A1 | 6/2015 | Maguire |
| 2016/0040661 A1 | 2/2016 | Maguire |
| 2017/0001354 A1 | 1/2017 | Nobuta et al. |

FOREIGN PATENT DOCUMENTS

| | | |
|---|---|---|
| DE | 3433693 A1 | 3/1986 |
| DE | 40 23 933 A1 | 1/1991 |
| EP | 1400332 A1 | 3/2004 |
| FR | 1 477 595 A | 4/1967 |
| FR | 2 273 648 A1 | 1/1976 |
| GB | 1145752 | 3/1969 |
| JP | 3550699 B2 | 8/2004 |
| JP | 2013-018283 A | 1/2013 |
| KR | 10-2011-0100596 A | 9/2011 |
| WO | WO 01/49374 A1 | 7/2001 |
| WO | WO 2015/089499 | 6/2015 |

(56) References Cited

OTHER PUBLICATIONS

Two-sided color brochure entitled Maguire: Model MPA Liquid Color Pump Maguire Products Inc. published Dec. 28, 1995.
International Search Report for PCT/US02/02934 dated Feb. 20, 2003.
Written Opinion for PCT/US02/02934 dated Mar. 24, 2003.
International Search Report for PCT/US11/021994 dated May 24, 2011.
Written Opinion for PCT/US11/021994 dated May 24, 2011.
Thirty-two page catalog entitled "Maguire Color Blending Equipment" published by Maguire Products Inc. 1993 United States.
International Search Report for PCT/US2014/070284 dated Apr. 15, 2015.
Written Opinion for PCT/US2014/070284 dated Apr. 15, 2015.
International Search Report for PCT/US2014/053391 dated Jan. 29, 2015.
Written Opinion for PCT/US2014/053391 dated Jan. 29, 2015.
Wayback Machine of SMC Linear Actuators Sep. 11, 2011 SMC Accessed on Apr. 6, 2016.
Wayback Machine of SMC Linear Actuator C02 Series Catalog Sep. 11, 2011 SMC Accessed on Apr. 6, 2016.
Extended European Search Report and Written Opinion for European Patent Application No. 14870414.1, dated Sep. 12, 2017.
European Search Report and Written Opinion for European Patent Application No. 14840183.9, dated Apr. 24, 2017.
Extended European Search Report and Written Opinion for European Patent Application No. 14840183.9, dated Aug. 7, 2017.
International Search Report and Written Opinion for PCT/US2018/025069; dated Jul. 17, 2018.
Dec. 31, 2018 Non-Final Office Action against Applicant's co-pending U.S. Appl. No. 15/420,762.
Mar. 6, 2019 Final Office Action against Applicant's co-pending U.S. Appl. No. 15/298,802.
Mar. 8, 2019 Final Office Action against Applicant's co-pending U.S. Appl. No. 14/700,911.
Jan. 25, 2019 Final Office Action against Applicant's co-pending U.S. Appl. No. 15/581,960.

\* cited by examiner

PLASTICS COLORING USING COTTONSEED OIL-BASED LIQUID COLOR COMPOSITIONS

CROSS-REFERENCE TO RELATED PATENT APPLICATIONS

This patent application is 35 USC 120 continuation-in-part of co-pending U.S. patent application Ser. No. 15/883,501, filed 30 Jan. 2018 in the name of Stephen B. Maguire and entitled "Cottonseed Oil Based Liquid Color Composition and Plastics Coloring Method Using the Same".

This patent application is also a 35 USC 120 continuation-in-part of co-pending U.S. patent application Ser. No. 15/432,495, filed 14 Feb. 2017 in the name of Stephen B. Maguire, published 1 Jun. 2017 as US2017/0152366 A1 and entitled "Liquid Color Composition with Cottonseed Oil Base".

This patent application is yet further a 35 USC 120 continuation-in-part of co-pending U.S. patent application Ser. No. 16/822,415, filed 18 Mar. 2020 in the name of Stephen B. Maguire and entitled "Cottonseed Oil Liquid Color Composition and Method".

The '495 application is a 35 USC 120 division of U.S. patent application Ser. No. 14/333,579, filed 17 Jul. 2014 in the name of Stephen B. Maguire, which issued 18 Jul. 2017 as U.S. Pat. No. 9,708,462, entitled "Liquid Color Composition with Cottonseed Oil Base".

The '579 application claimed priority from U.S. provisional application Ser. 61/847,119, filed 17 Jul. 2013 in the name of Stephen B. Maguire and entitled "Liquid Color Composition with Cottonseed Oil Base."

This patent application directly claims the benefit of the priority of the filing dates of the '501, '495 and '415 applications under 35 USC 120.

This patent application further indirectly claims the benefit of the priority of the filing dates of the '119 provisional application and the '462 patent through the '501, and '495 applications under 35 USC 120.

INCORPORATION BY REFERENCE

This patent application incorporates by reference the disclosures of U.S. Pat. Nos. 8,757,217; 9,188,118; 9,708,462 and 9,850,888.

STATEMENT REGARDING FEDERAL FINANCING RESPECTING THIS INVENTION

Not applicable; this development of this invention was financed entirely by private funding.

BACKGROUND OF THE INVENTION—FIELD OF THE INVENTION

This invention involves use of unprocessed, "pure" cottonseed oil as the primary ingredient or a secondary ingredient of a liquid carrier most desirably or use as liquid color by the plastics manufacturing industry and most desirably for use when fabricating plastic articles of a desired color.

As used herein the term "process machine" embraces extruders and injection molding presses.

As used herein "cottonseed oil" means oil that has been extracted from cotton plants, typically by pressing the seeds produced by the cotton plants. "Cottonseed oil" as used herein means such oil as extracted from the cotton seeds without any further processing; specifically the cottonseed oil is not "anodized" or "amidized" (the two terms are, erroneously, used somewhat interchangeably in the literature) and is not "partially anodized" or "partially amidized". The cottonseed oil may be filtered, after being extracted from the cotton seeds, to remove any seed particles or other impurities that may have contaminated the oil as it was extracted from the cotton seeds, but unless otherwise clearly stated cottonseed oil as used for practicing this invention and as the term "cottonseed oil" is used herein is "pure". The cotton seeds have an oil-bearing kernel surrounded by hard out hull; in processing the oil is extracted from the kernel, typically by pressing as noted above.

Most desirably, the cottonseed oil used in practice of this invention is "winterized", meaning that the pure cottonseed oil has been chilled to cause it to separate into a larger volume clear liquid phase and a smaller volume cloudy liquid phase made up of higher melting point fats. The cloudy phase is then filtered out leaving the clear phase, which is referred to as "winterized cottonseed oil".

So as used herein and as stated above, the term "cottonseed oil" means pure cottonseed oil that has not been "winterized".

In examples of practice of the invention and elsewhere in the specification and claims, the cottonseed oil is sometimes specified as being "winterized cottonseed oil", denoting the clear phase of cottonseed oil remaining after the oil has been chilled and unclear higher melting point fats have been filtered therefrom. The cottonseed oil has not been otherwise treated, has not been chemically modified in any way, and does not contain chemical or other additives, other than some or all of the additives disclosed herein as constituting or contributing to various aspects of the invention.

BACKGROUND OF THE INVENTION—DESCRIPTION OF THE PRIOR ART

Plastic products are most often colored.

Color pigments begin in powder form. Because powder is messy and difficult to handle, it is almost always pre-dispersed or formed into some "carrier" that is easier to handle. Such carriers in the prior art are usually solid, not liquid, phase materials, typically a polymer.

Typically color pigment in such solid form is pre-dispersed into pellets of plastic resin, with the pellets containing typically 50% pigment, by weight. In the United States, these pellets are referred to as "concentrate" and in Europe as "masterbatch". These "pigmented" pellets are, in turn, blended with a selected polymer to be molded into a finished plastic product, with the pigmented pellets being mixed with the selected polymer prior to introduction into the screw barrel of a process machine; sometimes the pigmented pellets are introduced into the screw barrel separately from the selected polymer.

DESCRIPTION OF THE INVENTION

A better method to make coloring pigment, as used to color plastic parts, easier to handle is to pre-disperse the pigment into a liquid carrier. This is one of the methods to which this invention is directed.

The liquid carrier for the pigment must be compatible with the selected plastic resin to which it is to be added. Different resins may require different carriers. When selecting a liquid carrier, certain characteristics are desirable while other characteristics must be avoided.

Surfactants, or "soap-like" carriers, can cause "slip" during the molding or extrusion process. Such "slip" must be avoided.

The liquid carrier must not break down at the high temperatures required in the molding or extrusion process that melt the plastic resin.

Carrier liquid that imparts an odor to the final part cannot be used when molding or extruding products to be used to contain food, such as plastic water bottles.

Cost and availability of the carrier liquid are always factors.

Heretofore, no single liquid carrier solves all these problems. However this invention is based in part on the discovery that cottonseed oil is superior to other carriers in meeting a number of these requirements and solving many of the aforementioned problems. Cottonseed oil is not known to have previously been used as a carrier for pigment in making liquid color for use in plastics molding or extrusion.

Cottonseed oil has a relatively high flash point, and a high smoke point, well above 400° F. Most other liquid carriers smoke below 400° F.

Cottonseed oil has very little odor. Cottonseed oil is known to be used as cooking oil that does not impart flavor to the food being cooked. This is a benefit when molding or extruding plastic products used for food packaging.

Cottonseed oil is high in antioxidants, providing an advantage in preserving products packaged in plastic that has been molded or extruded using a cottonseed oil carrier for the liquid color providing the color for the product packaging.

Cottonseed oil is high in vitamin "E", an antioxidant, which is often required as an additive when using other carriers.

Cottonseed oil is available in bulk qualities, and is competitively priced.

In one of its aspects, this invention provides a method of fabricating a plastic article of pre-selected color where the method includes preparing a blend, where the blend preferably comprises solid plastic resin pellets and liquid color of a hue and in an amount to impart the pre-selected color to the article to be fabricated, where the liquid color preferably includes at least cottonseed oil, and thereafter forming the blend preferably under pressure and heat into the plastic article. The method may preferably be accomplished either by injection molding or by extrusion. In practice of this aspect of the invention, the liquid color preferably comprises at least one dispersion of a single pigment in cottonseed oil. Even more preferably, the liquid color may comprise a plurality of dispersions, each of a single pigment in cottonseed oil.

The method may further include the liquid color preferably comprising at least one additive that improves the finished plastic product in strength and/or other properties or characteristics, and that facilitates and/or enhances performance of the molding or extrusion fabrication process. The additive may be selected from the group preferably comprising lubricants, blowing agents, light stabilizers, nucleating agents, antistatic agents, destabilizers and antioxidants.

In another aspect of this invention, the invention provides liquid colorant(s) for use in molding or extruding plastic products where the colorant preferably comprises pigment dispersed in cottonseed oil. In a more limited aspect of the invention, the invention provides a liquid colorant for use in molding or extruding plastic products consisting of only pigment and cottonseed oil.

In still another aspect, this invention provides a liquid colorant for use in molding or extruding plastic products where the colorant preferably includes pigment, cottonseed oil, and at least one additive, with the additive desirably being preferably dispersed together with the pigment in the cottonseed oil. In this aspect of the invention, the additive may preferably be one or more lubricants, blowing agents, light stabilizers, nucleating agents, antistatic agents, destabilizers and/or antioxidants.

In one preferred practice of this invention, single pigment dispersion is prepared initially by dispersing pigment of a desired color in cottonseed oil to create a liquid blend. The pigment is preferably initially introduced into a vessel containing the cottonseed oil, which acts as a liquid carrier. The pigment is preferably stirred into the cottonseed oil. The pigment is preferably added to the cottonseed oil in the known correct proportion. Typically the pigment added to the cottonseed oil is from 50% to 70% by weight of the resulting pigment-cottonseed oil dispersion blend. That is the preferred range; the range can be as low as 25% by weight of pigment, relative to the weight of the resulting pigment-cottonseed oil dispersion blend, and can range up to 80% by weight of pigment relative to the weight of the resulting pigment-cottonseed oil dispersion blend.

In another preferred practice of this invention, an additive dispersion is prepared initially by dispersing a selected additive in cottonseed oil to create a liquid blend. The additive is preferably initially introduced into a vat of cottonseed oil, which acts as a liquid carrier. The additive is preferably mixed into the cottonseed oil. The additive is added to the cottonseed oil in the known correct proportion. Typically the one or more additives added to the cottonseed oil may constitute as little as 0.1% by weight of the resulting blend; the upper limit of the range depends on the particular additive(s) selected.

Next the blend dispersion of the additive in the cottonseed oil may be milled if the additive is in solid phase by passing the blend through a mill serving to break down any agglomerates of additive that may remain in the blend, thereby reducing particle size of any solid additive to as small a size as possible. Any resulting particles of a solid additive are very, very small. Milling the blend allows use of less additive to perform the particular molding or extrusion function, thereby reducing costs. The milling may be done using a roller mill or a sand mill.

Additive-cottonseed oil carrier blends in accordance with the invention may be used to fabricate most commercially used thermoplastics, whether fabricated by means of extrusion, injection molding or blow molding, as well as thermoplastics that are fabricated using less conventional processes. When properly formulated, the additive-cottonseed oil blend according to the invention is compatible not just with a base resin, but frequently improves the fabricating process and/or the performance properties of the fabricated plastic parts. The cottonseed oil-based blend does not leach out of finished products, nor does the cottonseed oil by itself leach out of finished products. Cottonseed oil has been found to hold solid additive particles in suspension very well and accepts a high loading of same.

Additives in accordance with this invention may be formulated in various ways to provide various advantageous product characteristics. For example, commodity additives may be formulated in accordance with the invention to maximize savings without sacrificing processability and cosmetic appearance of the final plastic parts. Such commodity additives offer the processor economies and are suitable for mass manufacture of volume parts such as housewares, disposable goods, toys and the like.

The invention also has applicability to providing additive blends in cottonseed oil carriers for use in fabricating articles designed for outdoor use, specifically for lawn and garden applications, for the toy and recreation industries. The additives in accordance with the invention may be formulated to meet very stringent requirements of heat stability and color fastness of the resulting fabricated color parts. Such parts may be used in applications requiring extended exposure to sunlight and/or unusually high temperatures during the fabrication process.

The additives according to the invention may be produced to provide special effects such as fluorescent, phosphorescent, pearlescent, and non-dispersing finishes, where such unconventional appearances are dictated by the design of the parts.

Another aspect of the invention involves making additive blends, including liquid color as described herein, for use in the course of molding or extruding plastic parts by initially providing a collection of such additives. One selects a formula for the additive(s) and liquid carrier, preferably cottonseed oil that will provide the desired characteristic(s) for the plastic parts being molded or extruded. Selecting the formula may be a "trial and error" process, in that slight changes may require changes in the additive constituency, thereby requiring experimentation as to the exact formula of additive(s) required to produce the required characteristic in the finished or semi-finished molded or extruded plastic product hue.

Once the formula has been established for the amount of additive(s) and the amount of the preferable cottonseed oil liquid carrier, the additives are selected in amounts required in the formula. A liquid carrier, preferably cottonseed oil, is provided in an amount according to the formula and the selected additives are then blended, preferably but not necessarily all at once, into the cottonseed oil to produce the desired blend. Such additives can be milled if necessary. This method of the invention avoids the two-step process of making single additive dispersions, milling single additive dispersions individually, and then combining the single additive dispersions to produce the required additive blend.

The processing of thermoplastic resin and/or the performance of the fabricated plastic parts can often be greatly enhanced through use of such additives. Many commercial resins already include additives. However, significant benefits can be derived from further modification of such compounds in many cases. Moreover, use of additives affords a plastics processor the opportunity to tailor the plastic resin material to a specific application.

In general, in the plastics coloring aspect of the invention, it is desirable to put as much pigment into the cottonseed oil as is possible.

A resulting liquid dispersion blend of the pigment in the cottonseed oil may preferably be milled by passing the liquid through a mill serving to break down any agglomerates of pigment that may remain in the single pigment dispersion, thereby reducing particle size of the pigment to as small a size as possible. The resulting particles of pigment powder are very, very small, producing the fullest, richest color. Milling the single pigment dispersion allows use of less pigment to perform the particular coloring function, thereby reducing costs. Milling may be done using a roller mill or a sand mill. Both roller mills and sand mills are common industrial mills.

In the practice of the invention, it is desirable at times to produce a color or hue that differs from one of the colors of basic pigment. In such case, two or more single pigment dispersion blends, each dispersion blend being of a single pigment dispersed in cottonseed oil, are prepared. The two or more liquid single pigment dispersion blends are then themselves blended together to produce a resulting liquid dispersion blend exhibiting the desired hue or shade of color. The resulting liquid dispersion blend is then milled. This multi-step process allows milling a larger quantity of pigment in the resulting liquid dispersion blend at one time so that clean-up between milling different colors is required less frequently and the expense of milling of each of the single pigment liquid dispersion blends separately is avoided.

Use of cottonseed oil as the carrier for the single pigment liquid dispersion blend or the blend of several single pigment liquid dispersion blends results in liquid color that is compatible with nearly all resins are currently used in plastics molding and extrusion. The cottonseed oil-based pigment liquid dispersion blend does not leach out of finished products, nor does the cottonseed oil by itself leach out of finished products. The cottonseed oil holds the pigment powder particles in suspension in the liquid dispersion blend very well and accepts a high loading of pigment.

Pigment-cottonseed oil liquid colorant in accordance with the invention may be used to color most commercially used thermoplastics, whether processed by means of extrusion, injection molding or blow molding, as well as thermoplastics that are processed using less conventional processes. When properly formulated, the pigment-cottonseed oil liquid color dispersion blend according to the invention is compatible not only with a base resin, but also frequently improves the fabricating process and/or the performance properties of the fabricated plastic parts.

The range of thermopolymers with which the cottonseed oil colorants and single pigment cottonseed oil dispersions of the invention may be used is quite broad, and includes acrylic, nylon, acrylonitrile butadiene styrene, polycarbonate, polybenzimidazole, polyether sulfone, polyetherether keytone, polyethermide, polyethylene, polypropylene, polythenylene sulfide, polyphenylene oxide, polystyrene, polyvinyl chloride, polytetrafluoroethylene, as well as others that are known by and familiar to those of skill in the injection molding and extruding arts.

Liquid color according to this invention may be formulated in various ways to provide various advantageous product characteristics. For example, commodity colorants may be formulated in accordance with the invention to maximize savings without sacrificing processability and cosmetic appearance of the final plastic parts. Such commodity colorants offer the processor economies of color and are suitable for mass manufacture of housewares and the like.

The invention also has applicability to providing liquid color for use in fabricating plastic articles intended for outdoor use, specifically for lawn and garden applications. The liquid color dispersion blends in accordance with the invention may be formulated to meet very stringent requirements for heat stability and color fastness in the resulting molded or extruded color plastic parts. Such parts may be used in applications requiring extended exposure to sunlight and/or requiring unusually high temperatures during the fabrication process.

The liquid color dispersion blends according to the invention may be produced to provide special effects such as fluorescent, phosphorescent, pearlescent, and non-dispersing finishes, where such unconventional appearances are dictated by the design of the parts.

Liquid color in accordance with the invention is typically from 20% to 40% cheaper than use of pelletized solid color concentrate for the same molded or extruded plastic part.

In another method aspect of the invention, the liquid color dispersion blend is made for use in the course of molding or extruding plastic parts by initially providing a collection of pigments. Next a formula is selected for (i) the pigment(s) and (ii) the liquid carrier, which formula will provide liquid color dispersion blend producing a desired color hue in the finished plastic parts when the plastic parts are molded or extruded. Selecting the formula is typically a "trial and error" process, in that slight changes in the color hue as required for a given part may require changes in the pigment constituency in the final liquid color dispersion blend. In other words, experimentation may be needed to determine the exact formula of pigments required to produce the required color hue.

Once the formula has been established for the amount(s) of pigment(s) and the amount of liquid carrier, the pigment(s) are selected in amounts required in the formula for the collection of pigment(s). A liquid carrier of cottonseed oil is provided in an amount according to the formula and the selected pigment(s) is/are then blended, preferably but not necessarily all at once, into the cottonseed oil to provide a liquid color dispersion blend which will produce the desired color hue in the finished molded or extruded plastic parts. When this approach is used, the finished liquid color dispersion blend is generally not milled, as the mill would have to be cleaned after each separate color dispersion blend; however, the liquid color dispersion blend can be milled if necessary. This method of the invention avoids the two-step process of making multiple single pigment dispersions, milling the multiple single pigment dispersions individually, and then combining the milled collection of multiple single pigment dispersions into a single final liquid color dispersion blend which will produce the required liquid in the finished molded or extruded plastic part.

The processing of thermoplastic resin and/or the performance/properties of the fabricated color plastic parts can often be greatly enhanced through use of additives. Many commercial resins already include additives. However, significant benefits can be derived from further modification of such compounds, in many cases, by introduction of additives to the final liquid color dispersion blend or by introduction of additives during the course of the molding or extrusion process, or both. Use of additives affords a plastics processor, namely a molder or extruder, the opportunity to tailor a specific plastic resin material to a specific application.

The invention further embraces manufacture of plastic parts, especially colored plastic parts, using one or all of the methods disclosed herein, by molding or extruding the plastic resin using injection or compression molding machines or extruders. The invention further embraces the plastic parts made in accordance with the methods disclosed herein.

Some processing aid-type additives improve the operation and productivity of molding and extrusion machinery through reduction of internal friction; these additives are referred to as "lubricants." Other processing aid-type additives change polymer morphology and are referred to as "nucleating agents." Still other processing aid-type additives remove excessive heat in the course of blow molding processes and are in the form of endothermic blowing agents. Yet additional processing aid-type additives suppress thermal decomposition during processing and are generally referred to as "antioxidants."

Other additives, such as optical brighteners and destabilizers, enhance aesthetics and/or performance properties of the finished molded or extruded plastic parts by, for example, creating antistatic properties or ultraviolent light stabilization characteristics or environmental destabilization properties in the finished molded or extruded plastic product.

Modification of properties of thermopolymers through the addition of various chemical additives is economically preferable to the introduction of an entirely new resin that might provide the desired molding or extruding performance and/or the desired properties in the finished plastic product. The most facile and most economical way to incorporate these additives into the molding or extrusion process is through the use of liquid color, in accordance with this invention.

One group of suitable additives within the scope of the invention are slip agents which assist in polymer flow and provide improve internal and external slip characteristics which enhance the molding and extrusion processes. Friction, when processing polymers by molding or extrusion, often necessitates one or more slip agents or other lubricant(s) to improve cycle times, to improve dispersion of the resin, to assist in mold release and to improve assembility of molded parts. The amount of slip agent(s) needed depends on the molding or extrusion process and the end user's requirements for the product. Plastic consumer product packaging and plastic consumer end products often need slip agent(s) in the resin-color blend that is molded or extruded to facilitate assembly and/or operation of the finished plastic product.

Another group of additives within the scope of the invention are light stabilizing agents, which are usually in liquid form. Light stabilizers are effective in a broad range of plastics and help achieve long-term product sustainability for recycling. Suitable light stabilizers include hindered amines, typically referred to in the art as "HALS", which are chemical compounds containing an amine functional group and protect the molded or extruded polymer from the effects of photo-oxidation. Suitable light stabilizers further include ultraviolet light absorbers, which reduce the absorption of ultra-violet rays by the molded or extruded plastic part and hence reduce the rate of weathering by the part. Such ultraviolet light absorbers include benzotriazoles and hydroxyphenyltriazines for polycarbonates and acrylics, and oxanilides for polyamides, and benzophenomes for polyvinyl chloride. For certain applications, blends of these two types of light stabilizers synergistically provide even further improved product performance. Polymer photo-oxidation results from the combined action of light and oxygen. The visible result of photo-oxidation of the molded or extruded polymer product is deterioration of the appearance of the polymer as well as reduced mechanical stress and in some cases chemical breakdown. Suitable light stabilizers as disclosed herein protect against these phenomena. These light stabilizers, particularly the ultraviolet light absorbers, protect molded and extruded plastic products from ultraviolet rays ranging up to 390 nanometers.

Still another group of additives within the scope of the invention are nucleating agents, which are typically combinations of alumina silicate and a polyamide, that improve the physical properties of semi-crystalline polyolefins. Use of these nucleating agents results in faster crystallization rates, allowing faster cycle times and better production capacity and improved plastic part quality. When a nucleating agent is added to polypropylene, the crystalline structures of the polymer shrinks, reduces reducing the structure in size, resulting in improved product strength and resistance to bending, and in increased clarity in the structure of the finished molded or extruded polymer product. Additionally, when a nucleating agent is added to the process, the rate of crystal initiation increases dramatically, so the crystals become smaller in size thereby clarifying the polypropylene. Use of a liquid color dispersion blend combined with a nucleating agent provides a high crystallization temperature in the polymer, resulting in lower process cycle time, and very isotropic (uniform) shrinkage in the finished molded or extruded plastic product.

Yet still another group of additives within the scope of the invention are antioxidants, such as hindered phenolics, metallic deactivates, amines, phosphites, thioesters and binary blends of the foregoing. Heat inherently occurs and is internally generated within the resin pellets when molding or extruding plastic resin as the rotating screw in the molding machine or extruder barrel "works" the pellets of resin, pushing the resin pellets towards the barrel outlet by application of rotational and longitudinal force to the resin by the screw; the resin plasticizes as it moves toward the barrel outlet. When under higher than normal processing temperatures are experienced in the resin as it moves towards the barrel outlet, an additional stabilizer may be necessary to maintain the integrity of the polymer at it is "worked" and as it exits through the barrel outlet into a mold, in thecae of molded plastic products, or is leaves the screw barrel for collection or further processing in the case of extruded plastic products. Degradation of polymer resins due to excessive heat can adversely affect the process and finished plastic product stability, with a resulting residue contaminating the screw barrel. Post consumer recycled resins, commonly abbreviated as "PCR", when used as part or all of a resin blend for molding or extrusion, can be particularly troublesome by generating excess heat and consequential higher temperatures while being worked by the screw, with screw barrel contamination resulting. Addition of one or more antioxidant additives to various blends of virgin and PCR resins, or virgin or PCR resin alone, can provide enhanced heat stability to maintain a healthy polymer blend during working in the screw barrel; such antioxidant additives additionally typically provide improved long term resistance to heat aging in the finished plastic product.

Even still another group of additives within the scope of the invention are foaming agents which reduce the densities of molded and extruded plastic products. The matter of density of a given plastic product is receiving more and more societal attention because of the desire to make plastics more acceptable environmentally. Foaming agents reduce the amount of plastic needed to make a finished product, by reducing the density of the molded or extruded plastic, which in turn reducing the "carbon footprint" for a given plastic product. Foaming agents, which are typically liquid, can be added to the liquid color dispersion blend or can be metered directly into the plasticized melt flow in the screw barrel, achieving a desired reduced density in the molded or extruded plastic product. Molding or extruding with one or more foaming agents typically does not result in generation of excess heat in the barrel, so the resulting products do not have an excess heat history, which eliminates premature decomposition concerns; molding or extruding with an endothermic foaming agent reduces overall energy requirements for molding or extrusion operation. The selection of an endothermic foaming agent, an exothermic foaming agent, or a combination of both is within the scope of the invention. Suitable foaming agents are widely commercially available; Bergen International and RTP Company both produce such foaming agents.

Even still another group of additives within the scope of the invention are antimicrobial agents which are desirably inorganic silver-based antimicrobials such as silver chloride or silver sulfadiazine. These compounds inhibit growth of gram-positive/gram-negative bacteria, mold and yeast. Plastic products molded or extruded without an antimicrobial agent may experience microbial growth causing unsightly discoloration, staining, unpleasant odors as well as structural deterioration and corrosion/oxidation of the finished plastic product.

Even still another group of additives within the scope of the invention are resin melt flow modifiers. When molding or extruding plastic resin a slight change in resin dispersion and flow characteristics often benefits the process as well as the product. Resin melt flow modifiers when used as additives to the liquid color dispersion blend cure processing problems such as poor resin/melt dispersion, miniscule color contamination often occurring in the form of black specks, poor resin/melt flow properties, product mold release issues, product surface characteristics issues, reductions in desirable sheer stresses in the resin/melt while heating/working, and excessive energy consumption.

Even still another group of additives within the scope of the invention are destabilizers, which contribute to or cause chemical changes, such as oxidation and water and biodegradation, in the finished plastic products so that the plastic products either can be readily recycled or will breakdown in an accelerated fashion into environmentally acceptable compounds, typically ordinary wax. These destabilizers typically work by causing a decrease in the molecular weight of the polymer being molded or extruded, resulting in the polymer losing structural integrity. Among such destabilizers are mixtures of heptane, cellulose, methyl rhenium trioxide, butylated hydroxyl-toluene and polyphenol oxidase; organics including *Brevibacillus borstelensis, Rhodococcus rubber, Pseudomonas chlororaphis* and *Comamonas acidovorans*; ketone carbonyl; carbon monoxide carbonyl; starches; salts of metals including iron, cobalt and nickel;

The following examples further certain aspects of the invention and practice thereof:

Example 1

A mixture of 38 percent winterized cottonseed oil, 25 percent green pigment and 37 percent of a destabilizer was prepared, resulting in a green solution of a hue known to produce a desired green color in finished molded or extruded plastic parts. All percent figures are percent by weight. The solution was added to polymeric resin material, specifically polyvinyl chloride, at a ratio of 98% resin to 2% solution, again by weight, to produce a blend which was introduced into an injection molding machine and molded into finished plastic parts. The finished plastic parts were of the desired green color throughout.

Example 2

A mixture of 38 percent winterized cottonseed oil, 25 percent black pigment and 36 percent of a foaming agent was prepared, resulting in a black solution known to produce stark uniform black color in finished molded or extruded plastic parts. All percent figures are percent by weight. The solution was added to polyethermide resin at a ratio of 98% resin to 2% solution, again by weight, to produce a blend which was introduced into an injection molding machine and molded into finished plastic parts. The finished plastic parts were uniform, of the desired stark black color throughout.

Example 3

A mixture of 57 percent winterized cottonseed oil, 42 percent yellow pigment and 1 percent antimicrobial agent was prepared, resulting in a yellow solution to produce yellow color in finished molded or extruded plastic parts. All percent figures are percent by weight. The solution was added to polytetrafluoroethylene resin at a ratio of 98% resin and 2% blend, again by weight, to produce a blend which was introduced into an injection molding machine and molded into finished plastic parts. The finished plastic parts exhibited the desired shade of uniform yellow color throughout.

Example 4

A mixture of 48 percent winterized cottonseed oil, 20 percent blue pigment and 32 percent of a destabilizer was prepared, resulting in a blue solution known to produce a uniform desired shade of blue in molded plastic parts. All of the percent figures are percent by weight. The solution mixture was added to polystyrene resin at a ratio of 98% resin and 2% blend, again by weight, to produce a blend which was introduced into an injection molding machine and molded into finished plastic parts. The finished plastic parts exhibited the desired shade of blue color throughout.

Example 5

A mixture of 12 percent winterized cottonseed oil, 77 percent white pigment, 10 percent of an antioxidant and 1 percent of an antimicrobial was formulated to produce white plastic parts when molded. All the percent figures are percent by weight. The mixture was added to granular PCR resin at a ratio of 98% resin and 2% blend, again by weight, to produce a blend which was introduced into an injection molding machine and molded into finished plastic parts. The finished plastic parts were white throughout.

Accordingly, in one of its aspects, this invention provides a liquid colorant for use in molding or extruding plastic products comprising pigment and cottonseed oil, wherein the cottonseed oil is preferably winterized.

In another one of its aspects, this invention provides a liquid colorant for use in molding or extruding plastic products where the colorant consists of pigment and cottonseed oil only, wherein the cottonseed oil is preferably winterized.

As respecting the liquid colorant comprising pigment and cottonseed oil, that colorant may further comprise at least one additive. The pigment and the additive are preferably dispersed in the cottonseed oil. Most preferably, the pigment and the cottonseed oil are in the form of a dispersion of the pigment in the cottonseed oil. The pigment may be in the form of a plurality of dispersions, each of a single pigment, in the cottonseed oil. An additive may be included, where the additive is selected from the group comprising lubricants, blowing agents, light stabilizers, nucleating agents, anti-static agents, anti-oxidants and destabilizers.

The colorant may have pigment in each of the dispersions ranging from about 25% to about 85% by weight of the dispersion. When an additive is involved, the additive, the pigment, and the cottonseed oil define a blend and the pigment in the blend comprises from about 25% to about 80% by weight of the blend.

The invention further embraces a method for fabricating a plastic article of pre-selected color where the method includes preparing a blend comprising plastic resin and liquid color of a hue and in an amount by weight percent to impart the pre-selected color to the article to be fabricated, with the liquid color comprising cottonseed oil, most desirably winterized cottonseed oil, and the method proceeds by forming the blend under pressure and heat into a plastic article. The method may further include adding additive when preparing the blend of plastic resin and liquid color with the additive preferably selected from the group comprising lubricants, blowing agents, light stabilizers, nucleating agents, anti-static agents, destabilizers and anti-oxidants.

In the practice of the method, the resin is preferably selected from the group comprising acrylic, nylon, acrylonitrile butadiene styrene, polycarbonate, polybenzimidazole, polyether sulfone, polyetherether ketone, polyethermide, polyethylene, polypropylene, polythenylene sulfide, polyphenylene oxide, polystyrene, polyvinyl chloride, and polytetrafluoroethylene. In further practice of the method, the mixture is preferably 98% resin and 2% by weight liquid color that is introduced to a process machine screw to proceed with formation of the product of interest. If an additive is included, the mixture is preferably 98% resin and 2% by weight of a blend of liquid color and the additive comprising the mixture supplied to the process machines screw.

The invention further embraces a method for making liquid color for use in molding or extruding plastic parts of a desired color where the method includes the steps of providing a collection of pigments in powdered form, providing a quantity of cottonseed oil, which is preferably winterized, creating a plurality of single pigment dispersions in cottonseed oil and mixing selected ones of the dispersions to create the blend having a hue producing the desired color in extruded or molded plastic parts. In practice of this method aspect of the invention, the pigment in each of the dispersions preferably comprises from about 25% to about 80% by weight of the dispersion. Further regarding this aspect of the invention, the pigment in the blend preferably comprises about 25% to about 80% by weight of the dispersion.

In yet another one of its aspects, the invention provides a method for making plastic parts of desired color and strength where the method commences by selecting a polymer resin from the method comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene, providing a collection of pigments, selecting a formula of pigments of liquid carrier to produce liquid of hue providing the desired color in the finished plastic parts, from the collections, selecting pigments and amounts according to the formula, providing cottonseed oil as a liquid carrier in an amount according to the formula, and blending the selected pigments into the cottonseed oil, and thereafter using the screw of a process machine to apply heat and pressure to the mixture of the selected resin and the blend of cottonseed oil and pigment to form the plastic parts of a desired color and strength. In this aspect of the invention, the method may optionally include the additional steps of selecting a destabilizing additive, selecting a formula of pigments, liquid carrier, and the selected destabilizing additive that will produce liquid of hue providing the desired color in the plastic parts, selecting one or more pigments in accordance with the formula, providing cottonseed oil as a liquid carrier in an amount according to the formula, providing the selected destabilizing additive in an amount according to the formula, blending the selected pigments and the selected destabilizing additive into the cottonseed oil and using the screw of a process machine, applying heat and pressure to a mixture of the selected resin and the blend of cottonseed oil, pigment, and destabilizing additive to form the plastic parts of the desired color, strength, and durability.

The invention further embraces methods for making an additive blend for use in the course of molding or extruding plastic parts where the method includes the steps of providing a collection of additives selected from the group comprising lubricants, blowing agents, light stabilizers, nucleating agents, anti-static agents, destabilizers, and antioxidants, providing a quantity of cottonseed oil, creating a plurality of additive dispersions, one dispersion for each additive of the collect with each dispersion formed in a cottonseed oil carrier and thereafter mixing selected ones of the additive dispersions with cottonseed oil to create the additive blend.

The invention yet further embraces methods for molding or extruding plastic parts where the methods include the steps for providing a collection of pigments, providing a quantity of cottonseed oil, which may optionally be winterized, creating a plurality of single pigment/cottonseed oil dispersions, mixing selected ones of the dispersions to create a blend having a desired color hue, and adding the blend to thermoplastic resin in the course of molding or extrusion to produce the plastic parts. In this method aspect of the invention, the thermoplastic resin is preferably selected from the group comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene. In this aspect of the invention, the pigment in each of the dispersions preferably comprises from about 50% to about 70% by weight of the dispersion and may comprise from about 25% to about 80% by weight of the dispersion; in this method aspect of the invention the pigment in the blend may further comprise about 25% to about 80% by weight of the blend.

In this aspect of the method of the invention, the method may further embrace making plastic parts not only of the desired color and strength but also having a desired limited life, whereby the parts decompose at a desired pre-determined rate into natural products where the method further includes selected a destabilizing additive, selected a formula of pigments, liquid carrier, and the selected destabilizing additive that will produce liquid providing the desired color in the plastic parts, from the collection of pigments, selecting one or more pigments in accordance with the formula, providing cottonseed oil as a liquid carrier in an amount according to the formula, providing the selected destabilizing additive in an amount according to the formula, blending the selected pigments and the selected destabilizing additive into the cottonseed oil and using the screw of a process machine, applying heat and pressure to a mixture of the selected resin and the blend of cottonseed oil, pigment, and destabilizing additive to form plastic parts of the desired color, strength, and limited life. In this aspect of the invention, the method most preferably uses winterized cottonseed oil.

The invention further embraces a method of making an additive blend for use in the course of molding or extruding plastic parts where the method includes providing a collection of additives selected from the group comprising lubricants, blowing agents, light stabilizers, nucleating agents, anti-static agents, destabilizers, and anti-oxidants. The method proceeds with providing a quantity of cottonseed oil, which is preferably winterized. The method further proceeds with creating a plurality of additive dispersions with one dispersion being created for each additive of the collection and each dispersion being formed in a cottonseed oil carrier, where the cottonseed oil carrier is preferably winterized. The method then proceeds with mixing selected ones of the additive dispersions with the cottonseed oil to create the additive blend.

In still another one of its aspects, the invention embraces colored plastic parts, where the plastic is selected from the resin group comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene, whereby once the resin is selected a collection of pigments is provided, and a quantity of cottonseed oil is provided. From the collection of pigments, a plurality of separate single pigment dispersions in separate portions of the cottonseed oil are created. Selected ones of the single pigment dispersions are mixed to create a blend of the desired color, the blend is combined with the selected one(s) of the resins and the desired colored plastic part is molded from the resin-blend combination. As respecting the product, the pigment in each of the dispersions preferably comprises from about 25% to about 80% by weight of the dispersion. Additionally, the pigment in the blend may comprise about 15% to about 85% by weight of the blend. In this productden made by the process, at least one of the pigments is preferably a powder.

From the foregoing description of the invention it will be readily apparent to those skilled in the art to which the invention pertains that the principles and particularly the compositions and methods disclosed herein can be used for applications other than those specifically mentioned. The disclosed embodiments are therefore to be considered in all respects as being illustrative and not restrictive with the scope of the invention being indicated by the appended claims rather than by the foregoing description. All such applications of the invention are intended to be covered by the appended claims unless expressly excluded therefrom. All changes which come within the meaning and range of equivalency of the claims are therefore intended to be embraced therein.

As used in the claims "comprising" means "including" while "consisting of" means "having only", and "consisting essentially of" means having the stated elements plus trivial addition of other things that do not materially affect the claimed invention.

The following is claimed:

1. A method of fabricating a plastic article of preselected color, comprising:
   a) preparing a blend comprising plastic resin and liquid color of a hue and in an amount by weight percent to impart the preselected color to the article to be fabricated;
   b) the liquid color comprising cottonseed oil, wherein the cottonseed oil is winterized;
   c) forming the blend under pressure and heat into the plastic article.

2. The method of claim 1 further comprising adding additive when preparing the blend of plastic resin and liquid color.

3. The method of claim 2 wherein the additive is selected from the group comprising lubricants, blowing agents, light stabilizers, nucleating agents, antistatic agents, destabilizers and antioxidants.

4. The method of claim 1 wherein the plastic resin is selected from the group comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene.

5. The method of claim 2 wherein the resin is selected from the group comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene.

6. The method of claim 1 in which forming comprises introducing a mixture of 98% by weight resin and 2% by weight liquid color to a process machine screw.

7. The method of claim 2 in which forming comprises introducing a mixture of 98% by weight resin and a 2% by weight blend of liquid color and additive to a process machine screw.

8. A method making liquid color for use in molding or extruding plastic parts of a desired color comprising:
a) providing a collection of pigments in powder form;
b) providing a quantity of cottonseed oil;
c) creating a plurality of single pigment dispersions in cottonseed oil;
d) mixing selected ones of the plurality of single pigment dispersions to create a blend having a hue creating the desired color in extruded or molded plastic parts.

9. The method of claim 8 wherein the pigment in each of the plurality of single pigment dispersions comprises from about 25% to about 80% by weight of each of the plurality of single pigment dispersions.

10. The method of claim 8 wherein the pigment in the blend comprises from about 25% to about 80% by weight of the blend.

11. The method of claim 8 further comprising adding at least one additive selected from the group comprising lubricants, blowing agents, light stabilizers, nucleating agents, antistatic agents, destabilizers and antioxidants, to the blend.

12. The method of claim 11 wherein the pigment and the additive(s) in the blend together comprise from about 25% to about 80% by weight of the blend.

13. A method for making plastic parts of desired color and strength, comprising:
a) selecting a polymer resin from the ones of the group comprising from the group comprising selected from the group comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene which are known to provide desired strength in plastic parts;
b) providing a collection of pigments;
c) selecting a formula of pigments and liquid carrier that will produce liquid providing the desired color in plastic parts;
d) from the collection selecting pigments in amounts according to the formula;
e) providing cottonseed oil as a liquid carrier in an amount according to the formula,
f) blending the selected pigments into the cottonseed oil; and
g) using the screw of a process machine, applying heat and pressure to a mixture of the selected resin and the blend of cottonseed oil and pigment to form plastic parts of the desired color and strength.

14. A method of making an additive blend for use in the course of molding or extruding plastic parts, comprising:
a) providing a collection of additives selected from the group comprising lubricants, blowing agents, light stabilizers, nucleating agents, antistatic agents, destabilizers and antioxidants;
b) providing a quantity of cottonseed oil;
c) creating a plurality of additive dispersions, one dispersion for each additive of the collection, each dispersion formed in a cottonseed oil carrier; and
d) mixing selected ones of the plurality of additive dispersions with cottonseed oil to create the additive blend.

15. A method making liquid color for use in molding or extruding plastic parts of a desired color comprising:
a) providing a collection of pigments in powder form;
b) providing a quantity of cottonseed oil, wherein the cottonseed oil is winterized;
C) creating a plurality of single pigment dispersions in cottonseed oil;
d) mixing selected ones of the plurality of single pigment dispersions to create a blend having a hue creating the desired color in extruded or molded plastic parts.

16. A method for making plastic parts of desired color and strength and having a desired limited life, comprising:
a) selecting a polymer resin from the ones of the group comprising from the group comprising selected from the group comprising acrylic, nylon, acrylonitrile butadiene styrene, polycarbonate, polybenzimidazole, polyether sulfone, polyetherether ketone, polyether amide, polyethylene, polypropylene, polyethylene sulfide, polyphenylene oxide, polystyrene, polyvinyl chloride, and polytetrafluoroethylene which are known to provide desired strength in plastic parts;
b) providing a collection of pigments;
c) selecting a formula of pigments and liquid carrier that will produce liquid providing the desired color in plastic parts;
d) from the collection selecting pigments in amounts according to the formula;
e) providing cottonseed oil as a liquid carrier in an amount according to the formula;
f) blending the selected pigments into the cottonseed oil;
g) using the screw of a process machine, applying heat and pressure to a mixture of the selected resin and the blend of cottonseed oil and pigment to form plastic parts of the desired color and strength
h) selecting a destabilizing additive;
i) selecting a formula of pigments, liquid carrier and the selected destabilizing additive that will produce liquid providing the desired color in the plastic parts;
j) from the collection selecting one or more pigments in accordance with the formula;
k) providing cottonseed oil as a liquid carrier in an amount according to the formula;
l) providing the selected destabilizing additive in an amount according to the formula;

m) blending the selected pigments and the selected destabilizing additive into the cottonseed oil; and n) using the screw of a process machine, applying heat and pressure to a mixture of the selected resin and the blend of cottonseed oil, pigment and destabilizing additive to form plastic parts of the desired color, strength and limited life.

* * * * *